(No Model.) 2 Sheets—Sheet 1.
J. G. MORTON.
HAY PRESS.
No. 346,937. Patented Aug. 10, 1886.
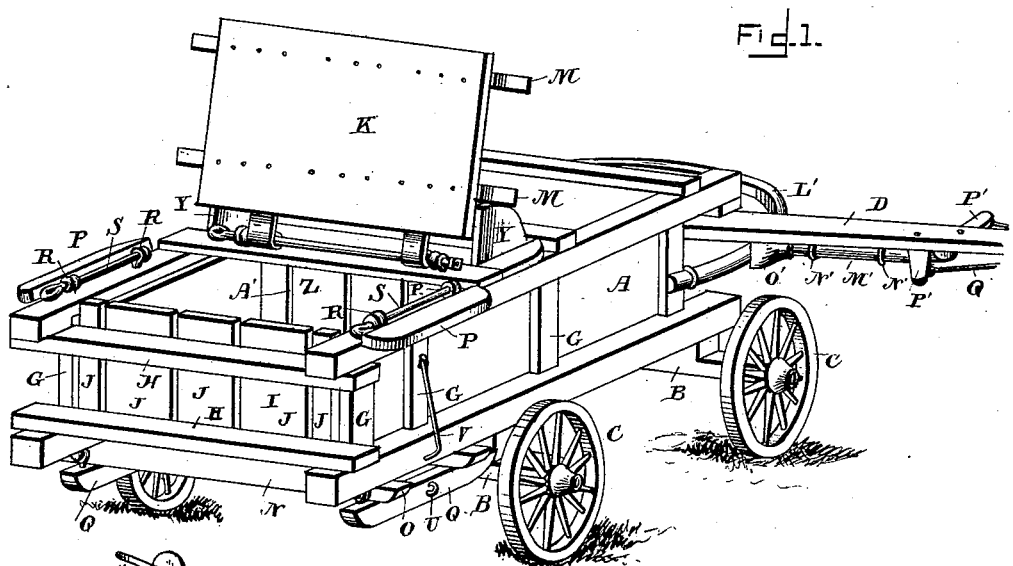
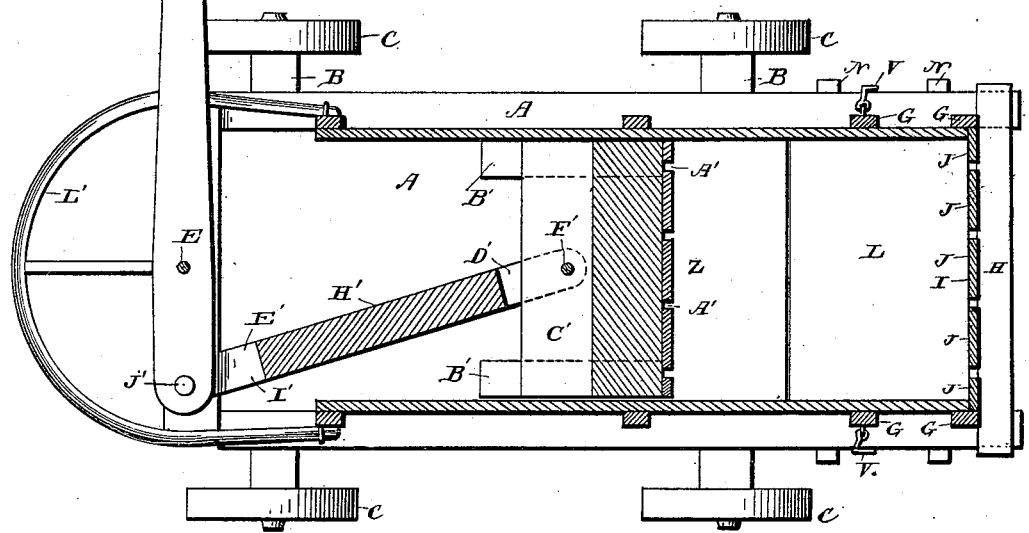
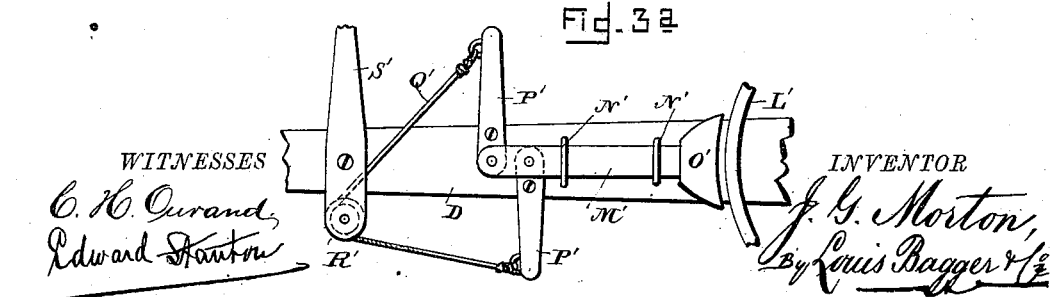
WITNESSES
C. H. Durand
Edward Stanton
INVENTOR
J. G. Morton,
By Louis Bagger & Co.
Attorneys.
N. PETERS, Photo-Lithographer, Washington, D. C.

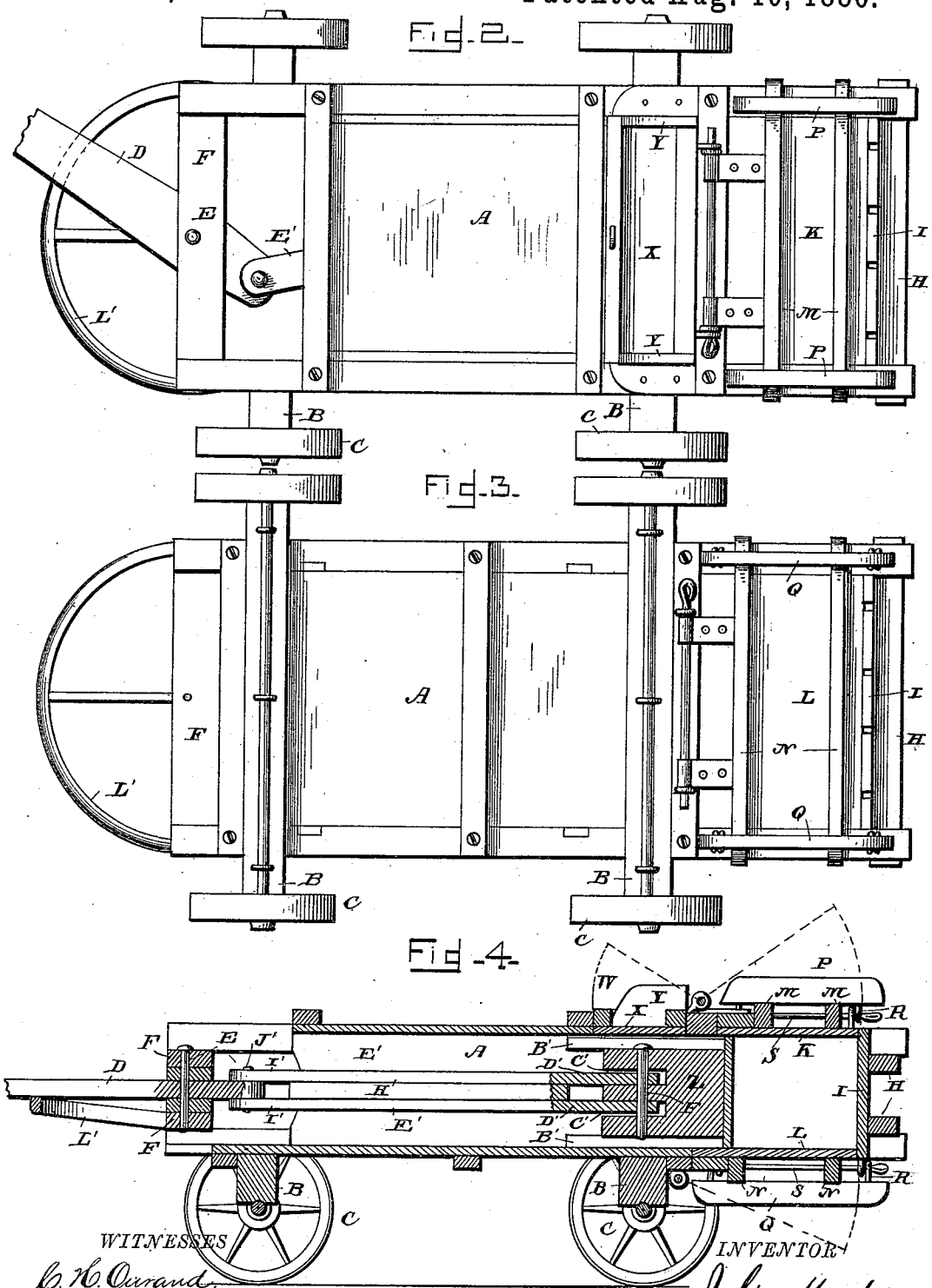

UNITED STATES PATENT OFFICE.

JAMES G. MORTON, OF CANTON, MISSOURI.

HAY-PRESS.

SPECIFICATION forming part of Letters Patent No. 946,937, dated August 10, 1886.

Application filed January 19, 1886. Serial No. 189,078. (No model.)

*To all whom it may concern:*

Be it known that I, JAMES G. MORTON, a citizen of the United States, and a resident of Canton, in the county of Lewis and State of Missouri, have invented certain new and useful Improvements in Hay-Presses; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved baling-press, showing it opened to be filled. Fig. 2 is a top view of the same. Fig. 3 is a bottom view. Fig. 3ª is a detached view of the brake mechanism. Fig. 4 is a longitudinal vertical section, and Fig. 5 is a horizontal section.

Similar letters of reference indicate corresponding parts in all the figures.

My invention has relation to that class of baling-presses for baling hay, straw, cotton, or similar products in which the plunger is pivoted to the end of a pitman the other end of which is pivoted to a crank or lever-arm, which is revolved by means of a team hitched to the end of a lever or beam; and it consists in the improved construction and combination of parts of the same, as hereinafter more fully described and claimed.

In the accompanying drawings, the letter A indicates the casing of the press, which is provided with two axles, B B, provided with wheels C, for the purpose of transporting the machine from one place to another, the wheels being of a sufficient height to allow a bale to be dropped from the press to the ground through the bottom of the casing. A lever or sweep, D, is pivoted near its inner end upon a vertical bolt, E, passing through cross-timbers F F in the forward end of the casing, and may serve as a tongue for the machine during transportation, as well as a means for operating the plunger. The rear end of the casing, which serves as the press-casing proper, is strengthened with suitable vertical side beams, G, and transverse beams H, and the rear end piece, I, is formed by a number of vertically-placed planks, J, secured to the cross-beams, with small spaces between them for the insertion of the bands or wires with which the bale is bound.

The top and bottom of the press-casing are formed by doors K and L, hinged at their forward edges and having transverse beams M M and N N, the ends of which project beyond the edges of the doors and are slightly cut away at their under sides, as shown at O, for the purpose of resting upon the beams or sills which form the edges of the casing.

Beams P P and Q Q are provided with short eyed arms R, which are hinged upon bolts or rods S at the edges of the open top and bottom of the press-casing, and these beams may swing over the ends of the transverse beams of the doors and hold the same closed. The beams Q at the bottom of the casing are provided with eyes U, into which hooks V may engage, the said hooks being pivoted to the sides of the casing, serving to retain the hinged beams in their raised position when the bottom of the press-casing is to be kept open.

The top of the casing is provided with an aperture, W, forward of the top door, and a door, X, covering the said aperture, is hinged to the same cross-beam as the top door, and the sides of this aperture are formed with upwardly-projecting flanges or boards Y Y, against the inner sides of which the side edges of the door will bear in opening or closing the door.

The plunger Z fits snugly and yet freely within the casing, and has its rear face formed with a number of vertical grooves, A′, registering with the spaces between the planks of the rear side of the casing, and the sides of the plunger are provided with guide-bars B′, which bear against the sides and top and bottom of the casing, projecting with their ends forward of the body of the plunger, for the purpose of keeping the plunger true within the casing, and the forward end of the plunger is formed with two transverse grooves or recesses, C′ C′, into which the ends D′ D′ of two bars, E′ E′, forming the pitman, are pivoted upon a vertical bolt, F′, passing through the sides of the plunger and through the partitions separating the recesses.

The pitman G′ is formed of the two bars, E′, and of a shorter bar, H′, secured between them, and the forward ends, I′ I′, of the top and bottom bars are pivoted upon a bolt, J', passing through the inner end of the short arm of the lever or sweep. The team is hitched to the outer end of this sweep, to a bail, K', which may swing to either side of the sweep, and the inner portion of the sweep rests and slides upon a segmental track or arc, L'. A plunger, M', is secured to slide longitudinally in bails or bearings N' upon the under side of the sweep, and is provided at its inner end with a brake-shoe, O', which may bear against the under side of the segmental track, and the inner arms of two diverging levers, P' P', are pivoted to the outer end of this sliding plunger, having their fulcra upon the under side of the sweep. The ends of a cord or chain, Q', are secured to the outer ends of these levers, and the cord or chain passes over a pulley, R', upon the inner end of a hand-lever, S', pivoted upon the under side of the sweep, and having its outer long arm adapted to be grasped as a handle.

The operation of the press is as follows: The hay, or whatever material it is desired to press, is packed into the press-casing through the open top door and through the door forward of the top door, and when the casing is full the top door is closed and secured by means of the hinged beams, whereupon the smaller door is closed, the side edges of this door bearing against the upright boards or flanges, preventing any hay from projecting and from being caught between the door and the side edges of the aperture, whereupon the team is driven so as to bring the sweep to stand in its central position, which will force the plunger against the hay, compressing it until the plunger projects to the rear of the forward edges of the top and bottom openings in the casing. The brake upon the sweep is closed upon the segmental track to prevent the expansion of the hay in the bale from forcing the sweep past the central position, and the top and bottom doors are opened and the wires or bands placed around the bale and secured, the ends of the bands being inserted through the spaces between the planks of the rear side of the casing and secured together there. The team is now allowed to go forward, swinging the sweep to one side, the brake preventing the sweep from being forced onto the team by the expansion of the bale, and the pressure being released from the bale, the bale will drop through the open bottom aperture. The bottom door is now again closed, the casing filled, the top doors closed, and the sweep again drawn toward its central position, and so forth. The size of the bale may be varied by inserting false bottoms at the end piece of the casing. The sweep having the team hitched to the swinging bail at its end, the team may be turned at the end of the sweep to draw it in either direction, and the hand-lever operating the brake may be drawn to either side of the sweep for closing the brake upon the segmental track.

Having thus described my invention, I claim and desire to secure by Letters Patent of the United States—

1. In a baling-press, the combination of a press-casing having filling and discharging apertures provided with suitable doors, a plunger reciprocating in the casing, a sweep pivoted near its inner end, a pitman pivoted to the inner end of the sweep and to the plunger, and means for retaining the sweep in its central position, as and for the purpose shown and set forth.

2. In a baling-press, the combination of a press-casing, a plunger reciprocating in the same, a sweep pivoted near its inner end, a pitman pivoted to the sweep and to the plunger, a segmental track concentric with the sweep, a plunger sliding longitudinally upon the sweep and having a brake-shoe at its inner end bearing against the segmental track, levers pivoted to the sweep and having their inner ends pivoted to the outer end of the sliding plunger, a hand-lever pivoted upon the sweep and having a pulley at its inner end, and a cord or chain secured at its ends to the ends of the levers and passing over the pulley of the hand-lever, as and for the purpose shown and set forth.

3. In a baling-press, the combination of a casing having doors in its top and bottom and having a small door forward of the top door, means for retaining the top and bottom doors, a sweep fulcrumed near its inner end at the forward end of the casing, a pitman pivoted to the inner end of the sweep, and a plunger pivoted to the rear end of the pitman and reciprocating within the casing, the stroke of the plunger being extended to the rear of the forward edges of the top and bottom doors, as and for the purpose shown and set forth.

4. In a baling-press, the combination of a casing having a top and bottom door at its rear end and provided with outwardly-projecting cross-beams, beams having short arms hinged at the sides of the doors and fitting over the projecting ends of the cross-beams, a door closing an aperture in the casing forward of the top door and bearing with its side edges against boards or flanges at the sides of the aperture, a plunger reciprocating in the casing, a sweep fulcrumed near its inner end in the forward end of the casing, a pitman pivoted to the inner end of the sweep and to the plunger, and means for retaining the sweep in its central position, as and for the purpose shown and set forth.

In testimony that I claim the foregoing as my own I have hereunto affixed my signature in presence of two witnesses.

JAMES G. MORTON.

Witnesses:
R. W. NELSON,
JOHN WHITE.